April 19, 1932.  J. STEFANSON  1,855,071
STEERING METER
Filed Sept. 28, 1931  2 Sheets-Sheet 1
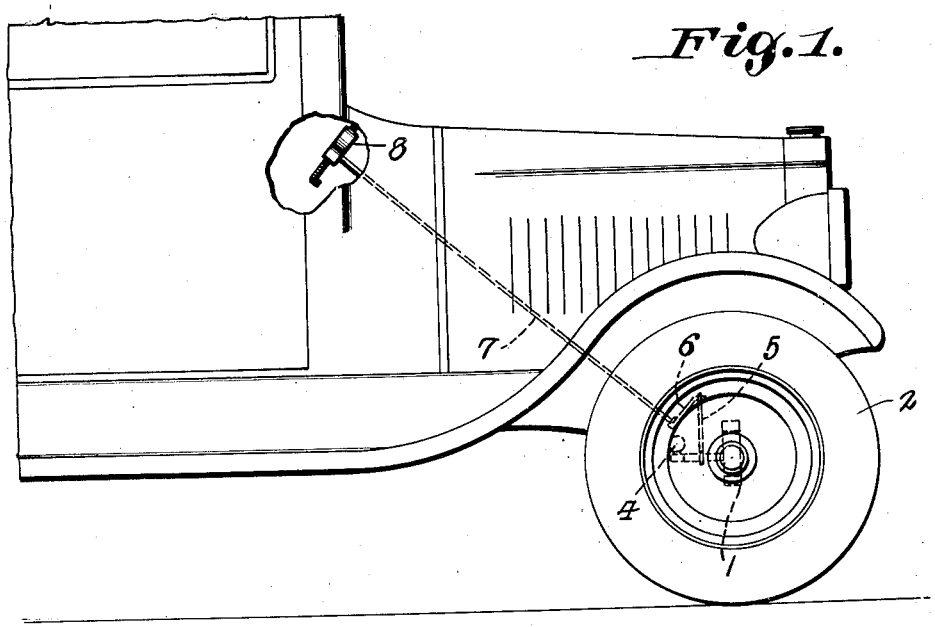
Fig.1.
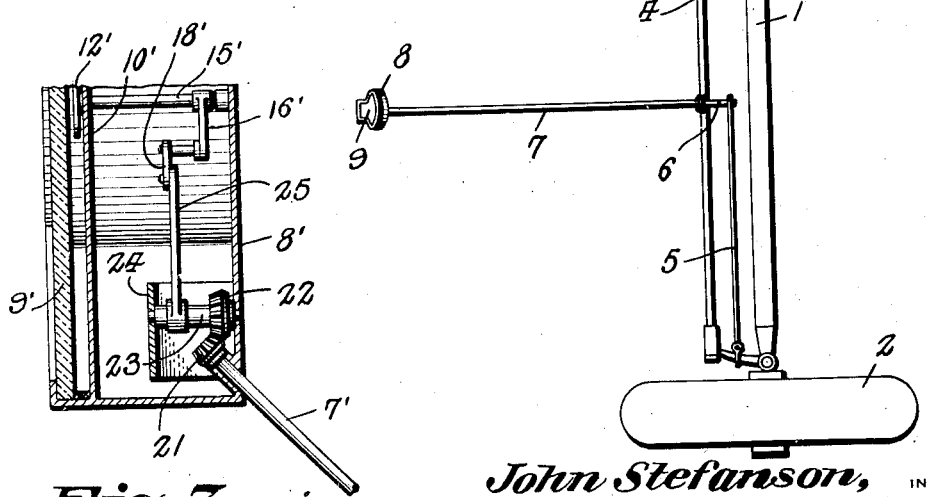
Fig.2.
Fig.7.
John Stefanson, INVENTOR
BY Victor J. Evans and Co. ATTORNEY
WITNESS:

April 19, 1932.  J. STEFANSON  1,855,071
STEERING METER
Filed Sept. 28, 1931  2 Sheets-Sheet 2

John Stefanson, INVENTOR
BY Victor J. Evans and Co. ATTORNEY

WITNESS:

Patented Apr. 19, 1932

1,855,071

UNITED STATES PATENT OFFICE

JOHN STEFANSON, OF CALISTOGA, CALIFORNIA

STEERING METER

Application filed September 28, 1931. Serial No. 565,682.

My present invention has reference to a front wheel angle indicator for automobiles or like vehicles.

An object of the invention is to arrange upon the instrument board of an automobile or like vehicle an indicator having a representation thereon of the plan of the vehicle on which it is installed, the front wheels and the ground surface over which the wheels travel when the vehicle is driven in a straight direction, together with angle scales at the opposite sides of the road indicating surface and together with means connected with the steering gear of the vehicle and the mechanism on the casing for causing the wheels of the miniature plan of the vehicle in the casing to turn simultaneously with and in the same direction of the turning of the wheels of the vehicle and whereby the driver will have visible indication as to the exact angles the front wheels are turned and further whereby the driver, when parked in a small space may, without necessitating his constant observation of the ground conditions, the vehicle to the front of the vehicle of his machine, extricate himself from the parking space without liability of danger to his car or vehicle or to those to the front and rear thereof and also wherein the device may be employed to indicate unnecessary loose play in the steering wheels of the automobile.

A further and important object of the invention is the provision of an indicator for this purpose that is characterized by simplicity in construction, cheapness in manufacture, ease in application and reliability and efficiency in practical use.

To the attainment of the foregoing the invention consists in the improvement hereinafter described and definitely claimed.

In the drawings:

Figure 1 is a side elevation of the front portion of a vehicle equipped with the improvement.

Figure 2 is a top plan view of the front running gear of the vehicle with the improvement applied.

Figure 7 is a sectional view approximately similar to Figure 5 but illustrating a slight modification.

Figure 3:
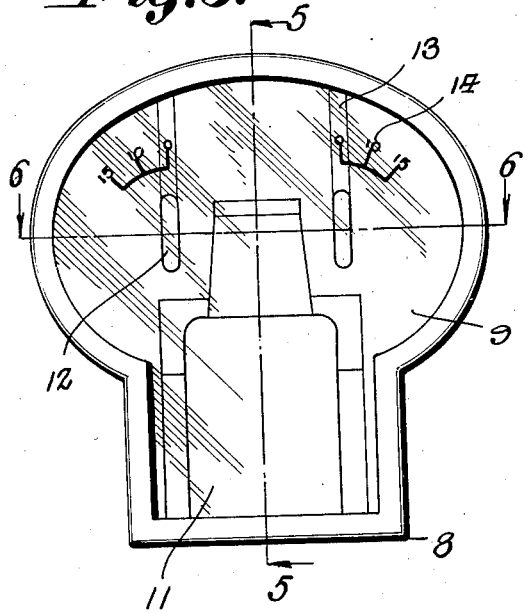
Figure 3 is a face view of the indicator.
Figure 4:
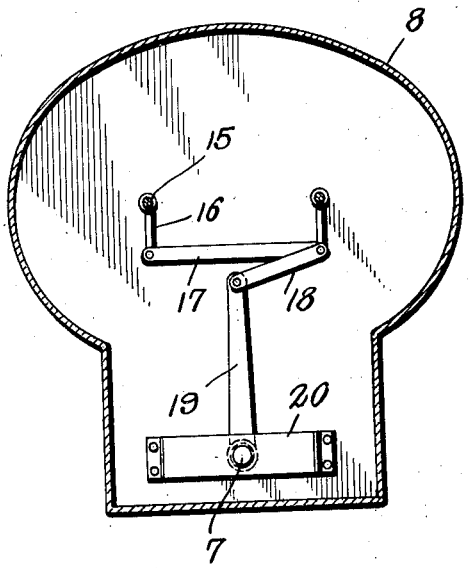
Figure 4 is a sectional view approximately on the line 4—4 of Figure 5.
Figure 5:
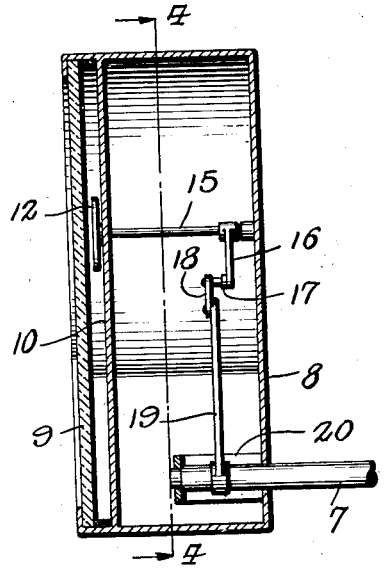
Figure 5 is a sectional view approximately on the line 5—5 of Figure 3.
Figure 6:
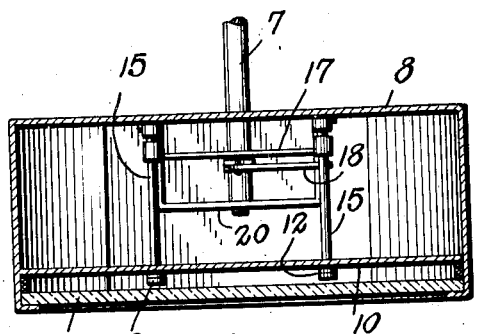
Figure 6 is a sectional view approximately on the line 6—6 of Figure 3.

Referring now to the drawings the numeral 1 designates the front axle of an automobile or like vehicle which has pivotally mounted on its ends the knuckles for the spindles for the front wheels 2. The spindles are provided with the usual arms 3 to which are connected the ends of the rod 4. The rod 4 is operated in the usual manner and, of course, imparts simultaneous swinging to the wheels 2.

Secured to one of the arms 3 there is a rod or arm 5 directed toward the center of the axle 1 and whose end is loosely connected with a swingable arm 6 which is pivotally supported upon a rod 7. The rod 7 is journaled in suitable bearings and enters the rear of the casing of the improvement. The casing 8 is secured upon the instrument board of the machine and the same preferably has an upper elliptical portion and a lower reduced rectangular portion. The front of the frame is removable and has arranged therein a transparent plate or window 9, corresponding, of course, to the shape of the casing to the rear of the transparent plate 9. There is secured in the casing a non-transparent plate 10 and on the lower portion of this plate there is delineated the body 11 of a miniature vehicle representing the vehicle upon which the indicator is applied. The front mud guards of the miniature vehicle are removed so that the front wheels 12 thereof are clearly observable. The plate 10 has inscribed thereon blocks or bars 13 which indicate the roadway over which the machine travels and the miniature wheels 12 have their sides arranged in a line with the sides or edges of the bars 13 when the vehicle is traveling in a straight ahead direction. The plate 10 has inscribed thereon degree marks 14, respectively, which are arranged at the opposite sides of the bars 13. When the miniature wheels 12 have turned they will turn in the direction of the scales 14 and will indicate to the driver the degree or angle which the front wheels 2 of the vehicle take, the front wheels 2, of course, being turned by the usual steering wheel and the mechanism associated therewith.

The miniature wheels 12 are really in the nature of metal plates which have their ends rounded and which like the miniature vehicle 11 are colored. Each of the plates 12 has fixed thereto and journaled to the plate 10 a short shaft 15 and to each of these shafts there is fixed a depending link 16. The links are connected by a bar 17 and to the pivot connecting the bar to one of the links there is attached another link 18. The link 18 is arranged at a downward angle with respect to the connecting bar or rod 17 and has its outer end pivotally secured to a throw arm 19 and this arm has its lower end fixedly secured to the shaft or rod 7. The inner end of the rod or shaft 7 is reduced, and received in a bearing opening in the center of a substantially U-shaped bracket 20 which is fixedly secured in the casing 8.

From the foregoing description when read in connection with the accompanying drawings it will be apparent that when the front wheels 2 of the vehicle are turned the miniature wheels 12 in the indicator casing will be simultaneously turned in the same direction as that of the wheels 2. This will indicate to the driver the exact angular arrangement of the front wheels and will permit him extricating his vehicle from small parking spaces without necessitating his constant observing the vehicles at the front or rear of his machine. This not only results in the saving of time in moving into or out of parking spaces but obviates the liability of the vehicle contacting with the parked machines. Also the improvement will indicate any unnecessary or undesirable looseness in the front wheels 2 of the automobile.

In instances where the instrument board of the vehicle is arranged in vertical position the rod or shaft 7' similar to the rod or shaft 7 has on the end thereof which enters the casing 8' a beveled pinion 21 which is in mesh with a similar pinion 22 that is fixed on a shaft 23, the said shaft having reduced ends which are journaled in bearing openings in the rear wall of the indicator casing and in a bracket 24 substantially similar to the bracket 20. The short shaft 23 has fixedly secured thereto an arm 25 which is similar to the arm 19 and which arm is connected to the elements for imparting a swinging or angular movement to the miniature wheels above described.

While I have illustrated a satisfactory embodiment of my improvement my features of invention are capable of extended application and I do not wish to be restricted to the precise details herein set forth and, therefore, hold myself entitled to make such changes therefrom as fairly fall within the scope of what I claim.

Having described the invention, I claim:

1. A front wheel angle indicator for automobiles, including a casing to be fixedly supported on the instrument board or at the front of an automobile, said casing having inscribed thereon a replica of the automobile in which the front wheels of the replica are in the nature of plates, and which indicator has also inscribed thereon bars representing the paths on which the wheels are supposed to travel when the vehicle is in a straight-ahead direction, the bars representing the wheels being pivotally supported and means between and operated by the steering mechanism for the front wheels for turning the miniature wheels simultaneously with and at the same angle as that assumed by the front wheels of the vehicle, and said indicator having further inscribed thereon degree scales which extend from the opposite sides of the bars.

2. A front wheel angle indicator for automobiles, including a casing to be fixedly supported on the instrument board or at the front of an automobile, said casing having inscribed thereon a replica of the automobile in which the front wheels of the replica are in the nature of plates, and which indicator has also inscribed thereon bars representing the paths on which the wheels are supposed to travel when the vehicle is in a straight-ahead direction, the bars representing the wheels being pivotally supported and means between and operated by the steering mechanism for the front wheels for turning the miniature wheels simultaneously with and at the same angle as that assumed by the front wheels of the vehicle, said means including links secured to the pivots, a bar connecting the links, an angularly arranged link pivotally secured to one end of the bar, an arm to which the last named link is pivoted, a shaft journaled in the casing and on which the arm is fixed, an angle arm on the outer end of the shaft, and a rod member connected to the arm and to one of the spindle arms for the front wheel of the automobile.

3. A front wheel angle indicator for automobiles, including a casing to be fixedly supported on the instrument board or at the front of an automobile, said casing having inscribed thereon a replica of the automobile in which the front wheels of the replica are in the nature of plates, and which indicator has also inscribed thereon bars representing the paths on which the wheels are supposed to travel when the vehicle is in a straight-ahead direction, the bars representing the wheels being pivotally supported, means between and operated by the steering mechanism for the front wheels for turning the miniature wheels simultaneously with and at the same angle as that assumed by the font wheels of the vehicle, said means compriscing links secured to the pivots, a bar pivotally secured to the links, an angle link pivotally connected to one end of the bar, an arm pivoted to the angle link, a shaft journaled in bearings in the casing on which the arm is fixed, a beveled gear on the shaft, a second and angularly arranged shaft having one end journaled in the casing and having a gear to mesh with the first named gear, an angle arm on the end of the last named shaft and a rod connection between the arm and the spindle arm of one of the front wheels of the automobile.

In testimony whereof I affix my signature.

JOHN STEFANSON.